United States Patent [19]

Kennedy et al.

[11] 3,913,696
[45] Oct. 21, 1975

[54] CHASSIS CONSTRUCTION FOR A MOTOR VEHICLE

[75] Inventors: James H. Kennedy, Sterling Heights; Robert D. Negstad, Dearborn, both of Mich.

[73] Assignee: Ford Motor Company, Dearborn, Mich.

[22] Filed: May 8, 1974

[21] Appl. No.: 467,983

[52] U.S. Cl............. 180/11; 180/64 M; 280/124 A
[51] Int. Cl.².......................................... B60K 5/02
[58] Field of Search................ 180/11, 64 R, 64 M; 280/124 B, 124 A

[56]         References Cited
         UNITED STATES PATENTS

| | | | |
|---|---|---|---|
| 2,708,003 | 5/1955 | Nallinger | 180/64 M |
| 2,756,834 | 7/1956 | Dauben | 180/11 X |
| 2,935,149 | 5/1960 | Nallinger | 180/64 M |
| 3,024,041 | 3/1962 | Maruhn | 280/124 A X |
| 3,075,601 | 1/1963 | Müller | 180/64 R |
| 3,093,390 | 6/1963 | Müller | 280/124 A X |
| 3,161,251 | 12/1964 | Kraus | 280/124 B X |
| 3,209,851 | 10/1965 | Collins | 180/64 R |
| 3,473,620 | 10/1969 | Müller | 180/64 R X |

*Primary Examiner*—David Schonberg
*Assistant Examiner*—Terrance L. Siemens
*Attorney, Agent, or Firm*—Clifford L. Sadler; Keith L. Zerschling

[57] ABSTRACT

In accordance with the presently preferred embodiment of this invention, a motor vehicle chassis includes a subframe of generally box shape that is supported on a vehicle frame by four resilient mounts. An independent front suspension has some of its suspension members pivotally supported on the vehicle frame and some pivotally supported on the subframe by resilient pivots. A vehicle power plant is supported on the subframe by a resilient mount. Suspension vibrations are isolated from the passenger carrying vehicle body supported on the frame by the resilient pivots which connect the suspension members to the subframe and the resilient mounts which connect the subframe to the regular vehicle frame. Power plant vibrations are isolated from the vehicle body by the resilient mount which connects the power plant to the subframe and the resilient mounts which connect the subframe to the vehicle frame.

3 Claims, 6 Drawing Figures

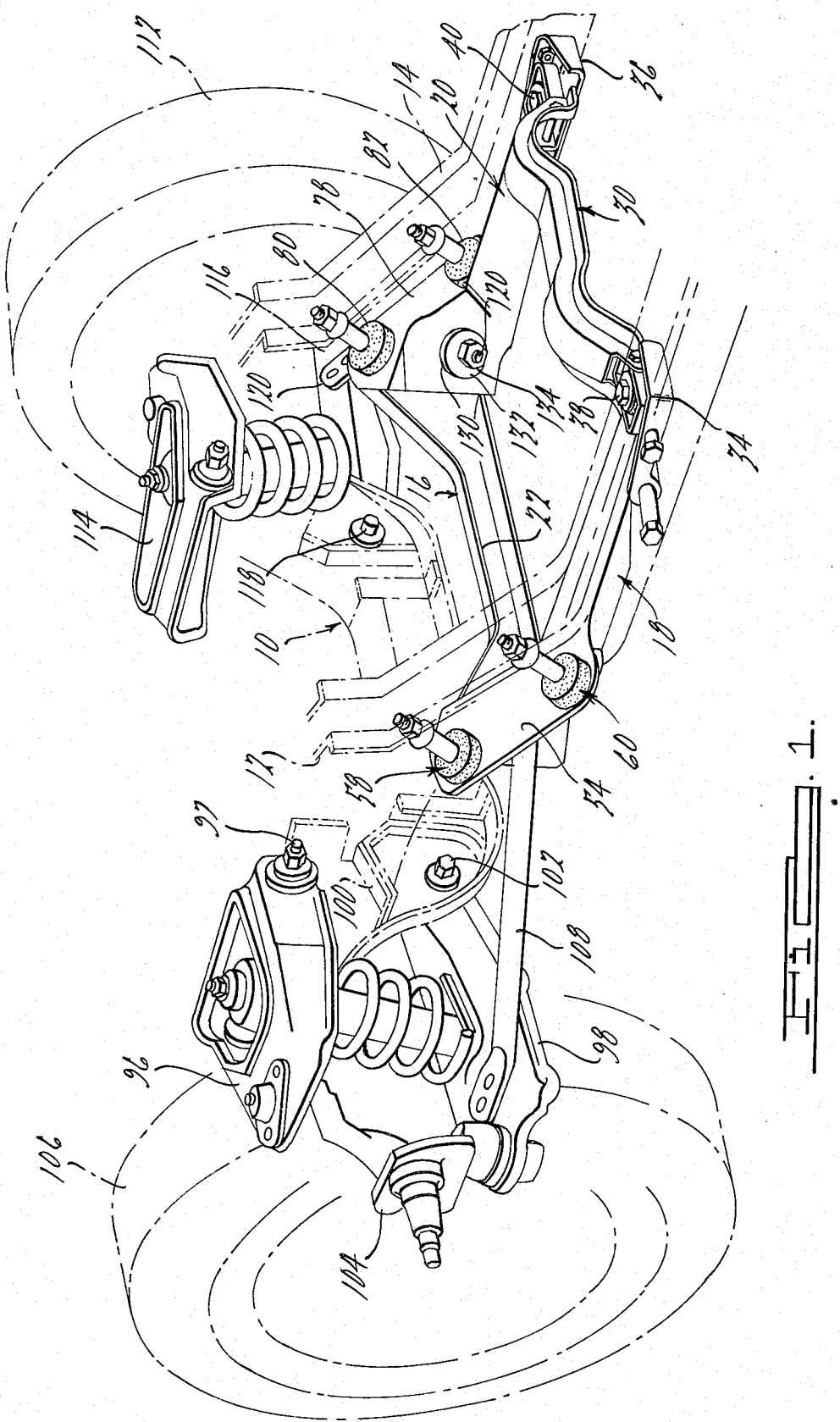

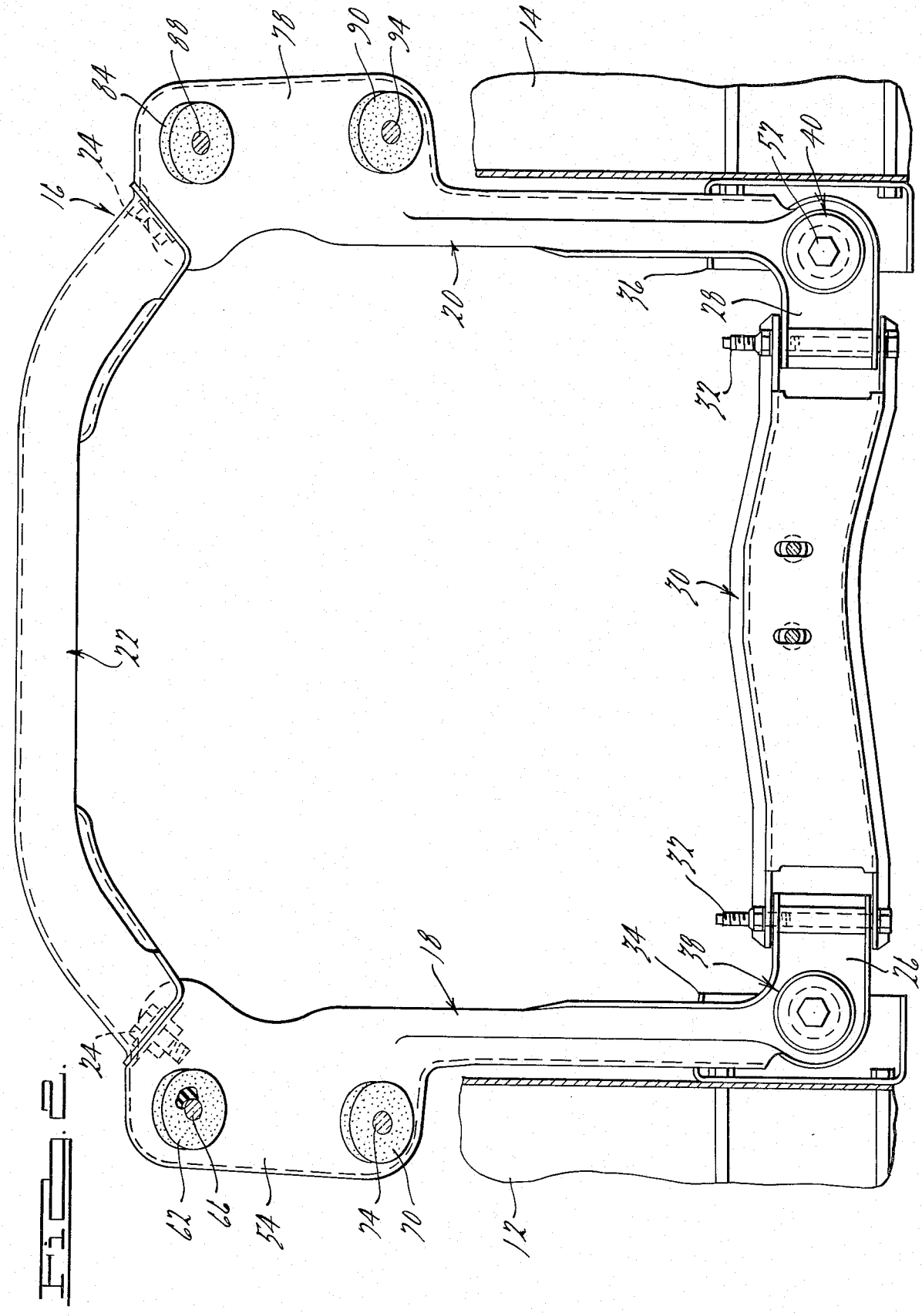

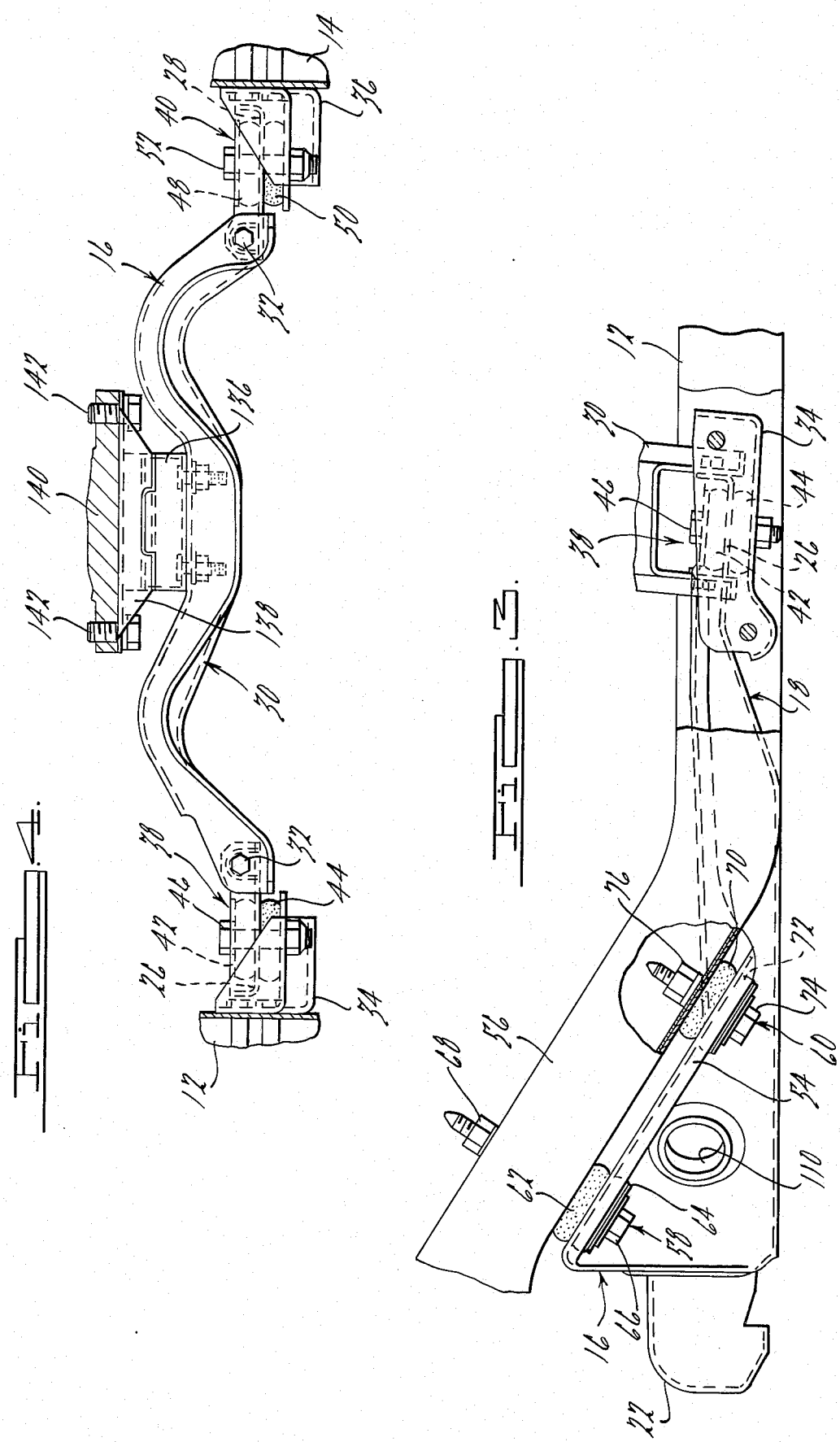

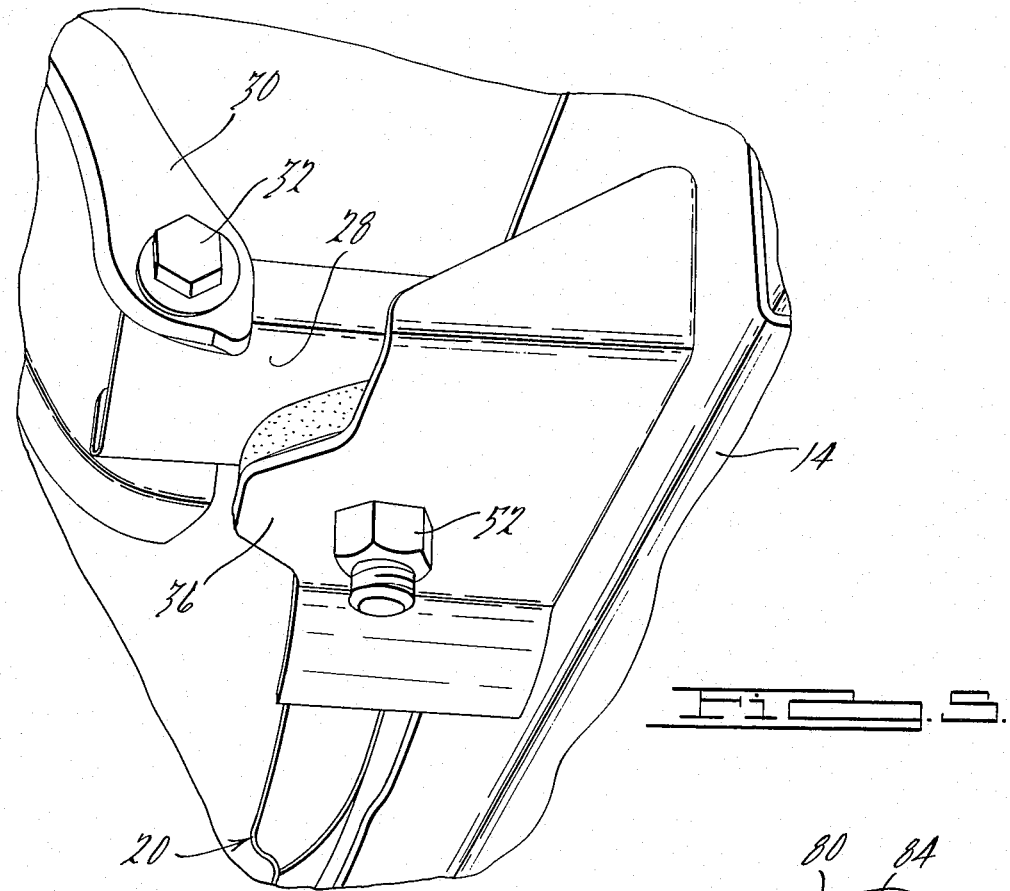
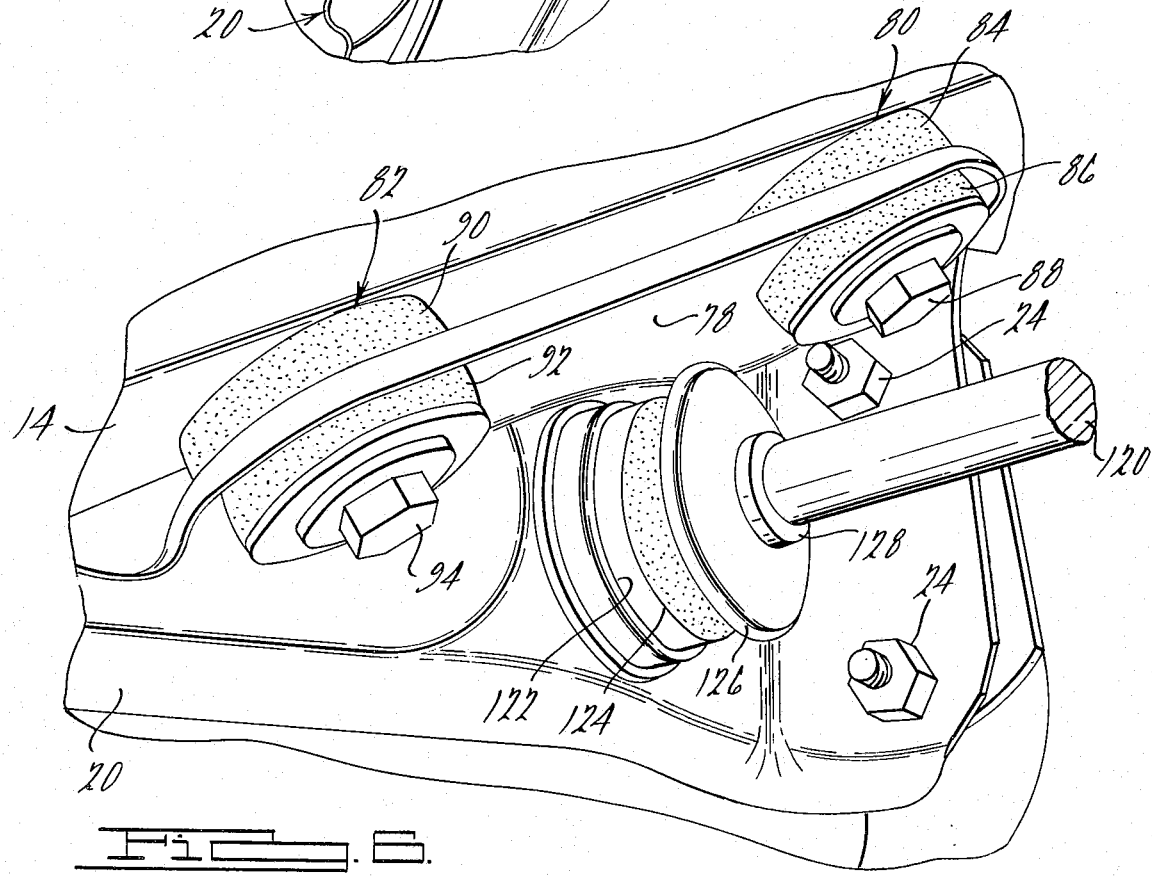

3,913,696

CHASSIS CONSTRUCTION FOR A MOTOR VEHICLE

BACKGROUND AND SUMMARY OF THE DISCLOSURE

The present invention relates generally to a motor vehicle chassis construction, and more particularly to means for isolating suspension and power plant noises and vibrations from the passenger carrying portion of the vehicle body. More particulary, the disclosure relates to an arrangement of interconnected rigid structural members that form a subframe assembly which is secured to a vehicle frame by means of resilient mounts. The subframe assembly, in turn, resilient supports a portion of the vehicle power plant and elements of the independent front suspension of the vehicle.

Accordingly, an embodiment of the present invention provides double isolation that is, two sets of resilient isolators functioning in series, for front wheel impact forces thereby improving low speed harshness. The embodiment of the invention also provides double isolation for the power plant rear mounting system thereby improving any powertrain disturbances that might otherwise be transmitted to the vehicle body. In addition, the mass of the power plant assembly is arranged to act as a damper for some of the tire induced road noises.

In the presently preferred embodiment of the invention, the vehicle frame includes a pair of longitudinally extending frame side rails. A subframe assembly has a pair of side members that are connected to transverse fore and aft members. The subframe assembly has a generally box shape in the plan view and is secured to the frame side rails by four resilient mounts. A resilient mount is located adjacent each of the corners of the subframe.

The vehicle chassis includes an independent front suspension system with lower suspension arms that are pivotally connected to the vehicle frame. Left and right suspension struts interconnect the lower suspension arms and the subframe assembly. The struts are joined to the subframe by resilient pivots.

The vehicle has an engine and transmission combination which forms a power plant that is supported on the aft transverse member of the subframe by a resilient mount.

Noise and vibration associated with the front suspension is isolated from the vehicle body, first, by the resilient pivots which connect the struts to the subframe, and second, by the resilient mounts which connect the subframe to the vehicle frame. Similarly, engine vibrations are twice isolated from the vehicle body. First, by the resilient mount where the power plant is supported on the aft transverse member, and second, by the resilient mounts which connect the subframe to the frame side rails.

A motor vehicle having a chassis constructed in accordance with this invention is characterized by a low level of noise and vibration in the vehicle passenger compartment. This desirable objective is achieved by the double isolation system.

BRIEF DESCRIPTION OF THE DRAWINGS

The many objects and advantages of a motor vehicle chassis constructed in accordance with this invention will become apparent upon consideration of the following detailed description and the accompanying drawings, in which:

FIG. 1 is a perspective view of a motor vehicle chassis having an isolated subframe assembly;

FIG. 2 is a top plan view of the subframe assembly of FIG. 1;

FIG. 3 is a side elevational view of the subframe assembly;

FIG. 4 is a rear elevational view of a subframe assembly;

FIG. 5 is a perspective view of the resilient mount securing the right rear portion of the subframe assembly to the right frame side rail; and FIG. 6 is a perspective view of the right front portion of the subframe assembly showing the connection between the subframe assembly and the right side rail and the connection between the right suspension strut and the subframe.

DETAILED DESCRIPTION OF A PREFERRED EMBODIMENT

Referring to the drawings herein the presently preferred embodiment of the invention is illustrated, FIG. 1 discloses a vehicle chassis frame 10 having left and right frame side rails 12 and 14. The frame 10 is constructed to support a passenger carrying vehicle body. A subframe assembly 16 having a generally box shape in plan view is secured to the frame side rails 12 and 14 by resilient mounts as will be described.

The subframe assembly 16 includes left and right subframe side members 18 and 20. The forward ends of the side members 18 and 20 are interconnected by a forward transverse member 22. The member 22 is secured to the subframe side members 18 and 20 by means of bolts 24.

The rearward end of the left subframe side member 18 has an inwardly directed portion 26. Similarly, the right member 20 has an inwardly directed end portion 28. A rear transverse member 30 spans the gap between the end portions 26 and 28 of the subframe members 18 and 20. The ends of the transverse member 30 are bifurcated and secured to the inwardly directed subframe portions 26 and 28 by means of bolts 32.

As is apparent in FIG. 2, the subframe assembly 16 comprising the side members 18 and 20 and the transverse members 22 and 30 forms a generally box shape structure in the plan view.

Means are provided for resiliently connecting the rearward corners of the subframe assembly 16 to the frame side rails 12 and 14. For this purpose, inwardly extending left and right brackets 34 and 36 are bolted to the inner walls of the side rails 12 and 14. Resilient mounts 38 and 40 secure the rearward subframe portions 26 and 28 to the frame brackets 34 and 36.

Referring to FIGS. 3 and 4, the left resilient mount 38 comprises an annular rubber element 42 that is situated above the subframe portion 26 and an annular rubber element 44 that is situated below the portion 26 but above the horizontal surface of the flange 34. A bolt 46 passes through aligned holes in the subframe portion 26 and the frame bracket 34 and through the centers of the annular rubber elements 42 and 44. The bolt 46 is tightened to secure the subframe assembly 16 to the bracket 34 of the left side rail 12. The rubber elements 42 and 44 are arranged to prevent metal-to-metal contact and to isolate the subframe assembly 16 from the frame rail 12.

The rearward portion 28 of the right subframe member 20 is secured to the frame bracket 36 in a similar manner. The resilient mount 40 includes upper and lower rubber elements 48 and 50 of annular shape. A bolt 52 extends through the rubber elements and through aligned holes in the subframe portion 28 and the right frame bracket 36.

Resilient means are provided for securing the forward ends of the subframe side members 18 and 20 to the frame side rails 12 and 14. The forward end of the left side member 18 has a flange portion 54 that slopes upwardly and forwardly. The left side rail 12 has a portion 56 adjacent to the flange 54 that slopes upwardly and forwardly in a similar manner. The flange 54 is secured to the rail portion 56 by means of a pair of resilient mounts 58 and 60.

Resilient mount 58 includes upper and lower annular rubber elements 62 and 64 through which a bolt 66 extends. The bolt 66 is threaded into a nut 68 welded to the frame rail portion 56. The resilient mount 60 includes upper and lower annular rubber elements 70 and 72 through which a bolt 74 extends. The bolt 74 is threaded into a nut 76 that is also welded to the frame rail portion 56. It will be noted in FIG. 3 that the axes of the bolts 66 and 74 extend upwardly and rearwardly.

The right subframe member 20 has an upwardly and forwardly sloping flange portion 78 that is secured to an inclined portion of the right frame side rail 14 by means of a pair of resilient mounts 80 and 82. The forward resilient mount 80 has upper and lower annular rubber elements 84 and 86 through which a bolt 88 passes. The bolt 88 is secured to a nut welded to the frame side rail 14. The rearward resilient mount 82 includes upper and lower annular resilient elements 90 and 92. A bolt 94 extends through the rubber elements 90, 92 and a hole in the flange 78 and into threaded engagement with a nut that is also welded to the rail 14.

Referring to FIG. 1, the front suspension of the vehicle includes a left upper suspension arm 96 that has its inner end pivotally connected by a pivot shaft 97 to a component of the frame 10. A left lower suspension arm 98 has its inner end connected to a bracket portion 100 of the frame 100 by means of a pivot bolt 102. A wheel support member or spindle 104 has its upper and lower ends connected to the suspension arms 96 and 98 by means of conventional ball joints. A steerable road wheel 106 is rotatably supported on the spindle 104.

A suspension strut 108 is interposed between the lower arm 98 and the subframe assembly 16. The strut 108 has its forward end rigidly connected to the arm 98. The rearward end of the strut 108 is connected to the forward portion of the left subframe member 18 by means of a bayonet type resilient pivot. The end of the strut 108 extends through a hole 110 in the subframe. Annular rubber elements are positioned on either side of the hole 110 and surround the end of the strut. Retaining washers are placed adjacent to the two rubber elements and a nut is tightened on the end of the strut 108 to complete the resilient pivot.

The suspension for the right wheel 112 includes an upper suspension arm 114 and a lower arm 116. The lower arm 116 is pivotally connected to a portion of the frame 10 by means of a pivot bolt 118. The wheel 112 is rotatably supported on a spindle (not shown) that is coupled to the upper and lower suspension arms 114 and 116.

The suspension for wheel 112 also includes a diagonally arranged strut 120 that has its forward end rigidly secured to the lower suspension arm 116. The other end of the strut 120 is connected to the right subframe member 20 by resilient pivot means as shown in FIG. 6.

The rearward end of the strut 120 extends through an opening 122 in the vertical portion of the right subframe member 20. An annular rubber element 124 surrounds the strut 120 and placed adjacent to the periphery of the opening 122. An enlarged metal washer 126 is disposed adjacent the annular rubber piece 124 and is seated against a shoulder 128 formed on the strut 120. The inner end of the strut 120 is surrounded by a second annular rubber piece 130, a second washer 132 and a nut 134 tightened on the threaded end of the strut. The resiliency of the rubber pieces 124 and 130 permits angular movement of the strut 120.

The motor vehicle of FIG. 1 includes an engine and transmission assembly which forms a power plant. The forward end of the power plant is resiliently mounted on the vehicle frame 10. The rear portion of the power plant is resiliently mounted on the transverse member 30 of the subframe assembly 16.

Referring to FIG. 4, the rear power plant mount includes a rubber block 136 that is bolted to a center portion of the subframe transverse member 30. A bracket 138 is bonded to the rubber block 136. The engine and transmission assembly or power plant 140 has its rearward end secured to the bracket 38 by means of bolts 142 whereby it is resiliently supported on the transverse member 30.

OPERATION

In accordance with the presently preferred embodiment of this invention, the subframe assembly 10 is formed by rigidly interconnecting side members 18 and 20 and transverse members 22, 30. The subframe assembly 10 has a generally box shape in plan view with each of its corners connected to left and right side rails 12 and 14 of the vehicle frame 10 by means of resilient mounts. The strut members 108 and 120 of the front suspension system are connected to the subframe assembly 16 by means of resilient mounts. The rear portion of the power plant 140 is supported on the subframe 16 by a rubber block 136.

The resilient mounts which secured the subframe assembly 16 to the frame 10 as well as the resilient pivots connecting the suspension struts 108, 120 to the subframe and the power plant resilient mount 136 each function as an isolator to retard the transmission of objectionable noise and vibration from the suspension and the power plant to the vehicle body supported on the frame 10.

The rubber pivots connecting the struts 108 and 120 to the subframe 16 and the rubber mounts connecting the subframe 16 to the frame 10 provide a double isolation, that is, two sets of isolators operating in series, for wheel impact forces. Similarly, the rubber block 136 in cooperation with the resilient mounts connecting the subframe 16 to the frame 10 provide double isolation. This construction provides two sets of insulators that operate in series to attenuate the transmission of power plant disturbances to the vehicle body.

The engine and transmission assembly being supported on the subframe assembly 16 also acts as a mass that dampens some of the road noises transmitted to the subframe 16 through the struts 118 and 120.

Suspension forces causing fore and aft movement of the wheels 106 and 112 are transmitted through the struts 108 and 120 and into the subframe 16. These forces are distributed through the side rails 12 and 14 and the vehicle's floor pan after they pass through the subframe mounts. The relatively wide spacing of the subframe mounts distributes these suspension forces broadly through the frame and body structure of the vehicle.

The mass of the engine and transmission assembly mounted on the isolated subframe by means of the resilient engine mount 136 acts like a damper to absorb some of the road and tire noise frequencies. The power plant induced frequencies also have a path through the suspension struts 108 and 120 to be distributed into the suspension before they can reach the main structure of the vehicle body.

In the preferred embodiment of the invention, a vehicle body is supported on the frame 10. The frame 10 may be separable from the vehicle body or it may be formed integral therewith as in the case of unitized body construction.

The foregoing description presents the presently preferred embodiment of this invention. Alterations and modifications may occur to those skilled in the art that will come within the scope and spirit of the following claims.

We claim:

1. A motor vehicle chassis comprising vehicle frame structure constructed to support a vehicle body,
   said frame structure including left and right longitudinally extending side rails,
   a subframe assembly having left and right longitudinally extending side members and fore and aft transversely extending members,
   said subframe assembly having a generally box shape in plan view,
   said longitudinally extending side members having forward end portions that extend upwardly and forwardly,
   left and right forward resilient mounting means connecting said forward end portions of said side members to said side rails,
   said forward resilient mounting means each comprising a resilient mount having an axis inclined upwardly and rearwardly in the side elevational view,
   a pair of aft resilient mounting means connecting said subassembly to said side rails,
   left and right suspension arms pivotally connected to said frame structure and constructed to be connected to left and right wheel support members,
   left and right suspension struts having their outer ends connected to said left and right suspension arms, respectively,
   resilient pivot means connecting the inner ends of said left and right struts to said forward end portions of said left and right side members of said subframe assembly, respectively,
   power plant mounting means supported on said subframe assembly,
   said power plant mounting means being constructed to be connected to a vehicle power plant and to retard the transmission of vibrations from said power plant to said subframe assembly.

2. A motor vehicle chassis comprising vehicle frame structure constructed to support a vehicle body,
   said frame structure including left and right longitudinally extending side rails,
   a subframe assembly having left and right longitudinally extending side members and fore and aft transversely extending members,
   said subframe assembly having a generally box shape in plan view,
   said longitudinally extending side members having forward end portions that extend upwardly and forwardly,
   a pair of forward resilient mounting means connecting said forward end portions of said side members to said side rails,
   said forward resilient mounting means each comprising a pair of side-by-side resilient mounts having parallel axes inclined upwardly and rearwardly in the side elevational view,
   a pair of aft resilient mounting means connecting said subassembly to said side rails,
   left and right suspension arms pivotally connected to said frame structure and constructed to be connected to left and right wheel support members,
   left and right suspension struts having their outer ends connected to said left and right suspension arms, respectively,
   resilient pivot means connecting the inner ends of said left and right struts to said forward end portions of said left and right side members of said subframe assembly, respectively,
   power plant mounting means supported on said subframe assembly,
   said power plant mounting means being constructed to be connected to a vehicle power plant and to retard the transmission of vibrations from said power plant to said subframe assembly.

3. A motor vehicle chassis comprising vehicle frame structure constructed to support a vehicle body,
   a subframe assembly having a pair of fore and a pair of aft resilient mounting means connecting said subframe assembly to said frame structure,
   said resilient mounting means being constructed to retard the transmission of vibrations from said subframe assembly to said frame structure,
   left and right suspension arms pivotally connected to left and right wheel support members and to said frame structure,
   left and right suspension struts rigidly connected to said left and right suspension arms, respectively,
   left and right resilient pivot means connecting said suspension struts to said subframe assembly,
   said resilient pivot means being constructed to retard the transmission of vibrations from said suspension struts to said subframe assembly,
   power plant mounting means supported on said subframe assembly,
   said power plant mounting means being constructed to be connected to a vehicle power plant and to retard the transmission of vibrations from said power plant to said subframe assembly.

* * * * *